US012443599B1

(12) United States Patent
Attaluri et al.

(10) Patent No.: US 12,443,599 B1
(45) Date of Patent: Oct. 14, 2025

(54) STORAGE-SIDE FILTERING FOR PERFORMING HASH JOINS

(71) Applicant: Amazon Technologies, Inc., Seattle, WA (US)

(72) Inventors: Gopi Krishna Attaluri, Cupertino, CA (US); Kamal Kant Gupta, Snoqualmie, WA (US); Saileshwar Krishnamurthy, Palo Alto, CA (US); Yingjie He, Cupertino, CA (US); Yongsik Yoon, Sammamsih, WA (US)

(73) Assignee: Amazon Technologies, Inc., Seattle, WA (US)

( * ) Notice: Subject to any disclaimer, the term of this patent is extended or adjusted under 35 U.S.C. 154(b) by 288 days.

(21) Appl. No.: 15/841,110

(22) Filed: Dec. 13, 2017

Related U.S. Application Data

(60) Provisional application No. 62/590,225, filed on Nov. 22, 2017.

(51) Int. Cl.
G06F 16/2453 (2019.01)

(52) U.S. Cl.
CPC .. *G06F 16/24544* (2019.01); *G06F 16/24537* (2019.01)

(58) Field of Classification Search
CPC .............. G06F 16/24544; G06F 16/24537
See application file for complete search history.

(56) References Cited

U.S. PATENT DOCUMENTS

| 8,359,316 | B2 | 1/2013 | Franke et al. | |
| 8,825,678 | B2 | 9/2014 | Potapov et al. | |
| 9,372,892 | B1* | 6/2016 | Chainani | G06F 16/2456 |
| 9,652,496 | B1* | 5/2017 | Antova | G06F 16/2456 |
| 9,767,149 | B2* | 9/2017 | Ozcan | G06F 16/24532 |
| 2006/0117036 | A1* | 6/2006 | Cruanes | G06F 16/2456 |
| 2009/0228514 | A1* | 9/2009 | Liu | G06F 16/8365 |
| | | | | 707/999.102 |
| 2010/0070514 | A1* | 3/2010 | Woodruff | G06F 16/958 |
| | | | | 707/754 |
| 2015/0379060 | A1* | 12/2015 | Levandoski | G06F 16/2322 |
| | | | | 707/607 |
| 2016/0034587 | A1* | 2/2016 | Barber | G06F 16/24542 |
| | | | | 707/754 |
| 2016/0188623 | A1* | 6/2016 | Finlay | G06F 16/2255 |
| | | | | 707/690 |
| 2016/0196306 | A1* | 7/2016 | Beavin | G06F 16/2255 |
| | | | | 707/714 |
| 2016/0350347 | A1* | 12/2016 | Das | G06F 16/258 |
| 2016/0350371 | A1* | 12/2016 | Das | G06F 12/023 |

(Continued)

Primary Examiner — Albert M Phillips, III
Assistant Examiner — Fernando M Mari Valcarcel
(74) Attorney, Agent, or Firm — S. Scott Foster; Kowert, Hood, Munyon, Rankin & Goetzel, P.C.

(57) ABSTRACT

Storage-side filtering may be implemented for performing hash join operations with respect to data stored in distributed data storage. When a query to a database stored in a distributed data store is received, a hash join operation may be identified for performing the query. As part of performing the hash join operation, a query engine may cause storage nodes in the distributed data storing data for the database to filter data before sending the data to the query engine according to a join predicate for the hash join operation. A result of the query may then be provided to a user, using the filtered data provided from the storage nodes.

16 Claims, 12 Drawing Sheets

(56) References Cited

U.S. PATENT DOCUMENTS

2017/0031988 A1* 2/2017 Sun .................. G06F 16/24554
2017/0116267 A1* 4/2017 Boehme ............ G06F 16/24557
2017/0169073 A1* 6/2017 Pirahesh ............. G06F 16/2433
2017/0185648 A1* 6/2017 Kavulya ........... G06F 16/24554

* cited by examiner

STORAGE-SIDE FILTERING FOR PERFORMING HASH JOINS

RELATED APPLICATIONS

This application claims benefit of priority to U.S. Provisional Application Ser. No. 62/590,225, entitled "STORAGE-SIDE FILTERING FOR PERFORMING HASH JOINS," filed Nov. 22, 2017, and which is incorporated herein by reference in its entirety.

BACKGROUND

While most existing relational databases are not distributed, some existing databases are "scaled out" (as opposed to being "scaled up" by merely employing a larger monolithic system) using one of two common models: a "shared nothing" model, and a "shared disk" model. In general, in a "shared nothing" model, received queries are decomposed into database shards (each of which includes a component of the query), these shards are sent to different compute nodes for query processing, and the results are collected and aggregated before they are returned. In general, in a "shared disk" model, every compute node in a cluster has access to the same underlying data. In systems that employ this model, great care must be taken to manage cache coherency. In both of these models, a large, monolithic database is replicated on multiple nodes (including all of the functionality of a stand-alone database instance), and "glue" logic is added to stitch them together. For example, in the "shared nothing" model, the glue logic may provide the functionality of a dispatcher that subdivides queries, sends them to multiple compute notes, and then combines the results. In a "shared disk" model, the glue logic may serve to fuse together the caches of multiple nodes (e.g., to manage coherency at the caching layer). These "shared nothing" and "shared disk" database systems can be costly to deploy, and complex to maintain, and may over-serve many database use cases.

Figure 1:
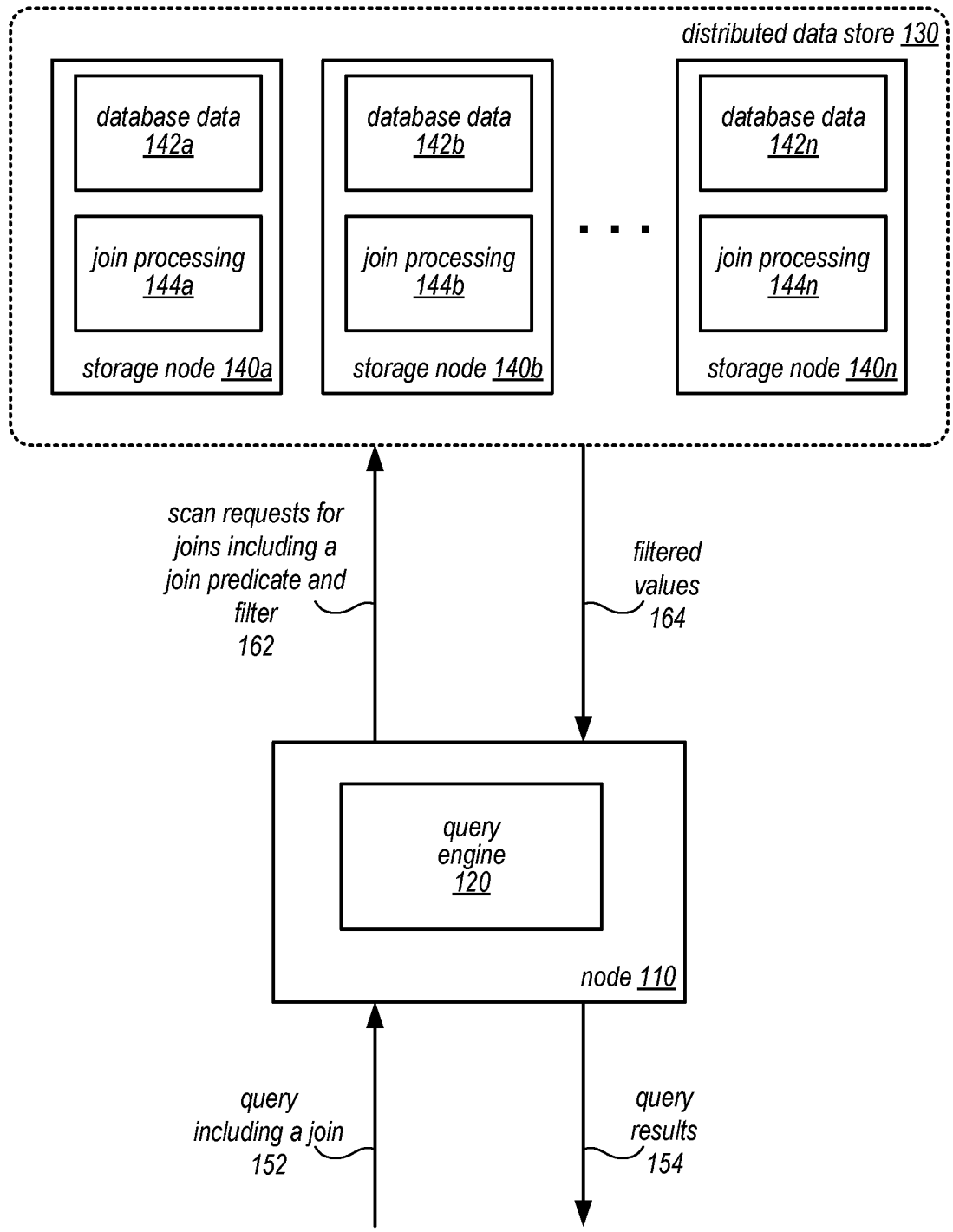
FIG. 1 is a logical block diagram illustrating storage-side filtering for performing hash joins, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of storage-side filtering for performing hash joins, are described herein. Distributed data storage systems may be implemented, in various embodiments, to increase both the storage capacity and access performance for data stored in the distributed data storage system. Databases, for instance, may be stored in distributed fashion in order to improve the capability of a query engine to access large amounts of data quickly. In order to utilize a distributed data storage system, a partitioning or other distribution scheme for data of a data set, such as a database, may be implemented in order to distribute data of a data set amongst different storage locations (e.g., different storage nodes) of the distributed data storage system, in various embodiments. Access to the data in the distributed data storage system may thus be performed according to the distribution scheme for the data, in some embodiments.

Hash join operations may be utilized to obtain related data from different objects within a data set, in various embodiments. For example, a hash join operation may be performed in order to serve a query to a database, joining data from different tables in the database according to a join predicate (e.g., common field or record value in table entries) which may be evaluated using a hash table generated from the values of one of the tables to be joined. Because related data that would satisfy the join predicate of a hash join operation may be stored in different locations in a distributed data storage system (e.g., entries for tables with a matching field value may be stored at different storage nodes), storage-side filtering for performing hash joins may be used to reduce the amount of data that is transferred to a common location (e.g., a query engine) that can check to see if the join predicate is satisfied for data stored at the different locations by filtering out data that would not satisfy the join predicate, in various embodiments. In this way, only a portion of the total data from the objects (e.g., tables) being joined may be sent, instead of sending the entirety of the data from the objects for evaluation to perform the hash join operation, saving communication bandwidth between the storage nodes and a query engine, and computational resources, such as processor utilization, memory, and other storage resources, of the query engine to perform the evaluation and operation of the hash join operation on the portion of the data.

FIG. 1 is a logical block diagram illustrating storage-side filtering for performing hash joins, according to some embodiments. The various features illustrated in FIG. 1 can implement various techniques discussed below with regard to FIGS. 6A-9, in some embodiments. For example, a node 110 (e.g. a host, server, or other computing device) may implement a query engine 120 to process access requests (e.g., SQL statements or other requests to create, read, update or delete data) stored in a database. The database may be stored in distributed fashion in a separate distributed data store 130. For example, hash-based distribution schemes may be implemented to locate entries of a database table at different storage nodes 140 according to a hash value generated from distribution key or value of one of the fields in the entry. Distributed data store 130 may include multiple storage nodes, such storage nodes 140a, 140b and 140n which may provide access to data for query engine 120 to process queries and other access requests to the database. Storage nodes 140 may store one (or more) respective partitions of database data (e.g., according to a distribution scheme), such as database data 142a, 142b, and 142n.

In order to reduce the costs of data transfer between distributed data store 130 and query engine 120, and the performance and storage costs of spilling at the query engine (e.g., when the query engine's allocated memory is unable to store the results of a query being performed, resulting in writing some data to disk or persistent storage in order to complete the query), storage-side filtering may be performed for operations such as a hash join operation at the storage nodes. In this way filtered results may be sent, reducing the traffic and data to be stored by query engine 120, in various embodiments. Storage nodes 140 may implement join processing, such as join processing 144a, 144b, and 144n, to read database data 142 apply join predicates and filters according to the various techniques discussed below with regard to FIGS. 6A-9. Join processing 144 may be implemented in addition to other storage access provided by storage nodes, such as block-based or page-based access where query engine sends requests for blocks or pages of data upon which query engine 120 may perform scans or other operations to process a query, in some embodiments. For example, as discussed below with regard to FIGS. 4-5 storage nodes may provide data pages in response to a query engine in order to perform a query and may provide tuples (or other data from the table) which the storage node may read, parse, evaluate or otherwise interpret before providing back a result to the query engine, in some embodiments. Therefore, join processing 144 may be implemented in addition to storage access handling that may be provided by storage nodes which does not evaluate or look inside of the data blocks or pages being returned (not illustrated), in some embodiments.

For example, a query including a join 152 may be received at query engine 120. The query engine may generate a query plan that includes sending instructions to perform a scan of table(s) to be joined to the storage nodes that includes a join predicate and filter 162. Join processing 144 at the storage nodes 140 may use the join predicate and filter (e.g., a bloom filter, range filter, or other value filter for the joined values of the join) to send filtered values 164 back to query engine 120 which may satisfy the join predicate (e.g., values which may have a matching entry in another table being joined). Query engine 120 can then complete processing of the query and provide a query result 154 using the filtered values 164 (e.g., by completing the hash join operation to match received values from multiple tables obtained from storage nodes 140 or receiving joined values from the storage nodes 140, as discussed below with regard to FIG. 6C). In some embodiments, generation of the filter may be performed in part, or in whole by query engine 120, as discussed below with regard to FIG. 8, whereas in other embodiments, storage nodes 140 may be perform part of the filter generation, which is then provided as part of the scan requests 162.

Please note, FIG. 1 is provided as a logical illustration of a distributed data store, query engine, and other depicted features, and is not intended to be limiting as to the physical arrangement, size, or number of components, modules, or devices to implement such features.

The specification first describes an example of a database system as a network-based database service that stores data for a database managed by the database service in a separate data storage service, according to various embodiments. Included in the description of the example network-based database service are various aspects of the example network-based database service along with the various interactions between the database service, the storage service, and a separate data store maintaining backup versions of data volumes in the storage service. The specification then describes a flowchart of various embodiments of methods for implementing storage-side filtering for performing hash joins. Next, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

The systems described herein may, in some embodiments, implement a service-oriented architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), a separate, distributed storage system (which may include multiple storage nodes that collectively perform some of the operations traditionally performed in the database tier of existing systems), and a backup storage tier.

As described in more detail herein, in some embodiments, some of the lowest level operations of a database, (e.g., backup, restore, recovery, log record manipulation, and/or various space management operations) may be offloaded from the database engine to the storage layer (or tier), such as a distributed storage system, and distributed across multiple nodes and storage devices. For example, in some embodiments, rather than the database engine applying changes to a database (or data pages thereof) and then sending the modified data pages to the storage layer, the application of changes to the stored database (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). Log sequence numbers may be assigned to the redo log records from a log sequence number space. In some embodiments, crash recovery (e.g., the rebuilding of data pages from stored redo log records) may also be performed by the storage layer and may also be performed by a distributed (and, in some cases, lazy) background process. In some embodiments, the storage layer may maintain backup versions of data volumes in a separate storage system (e.g., another storage service implemented as part of network-based services platform 200) by leveraging peer-to-peer replication among storage nodes to identify and obtain new updates to data volumes for inclusion in backup versions.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. Rather than duplicating an entire database instance one or more times and adding glue logic to stitch them together to scale a database, the systems described herein may instead offload the functionality of durability and space management layer from the database tier to a separate storage layer, and may distribute that functionality across multiple storage nodes in the storage layer, in some embodiments.

In some embodiments, the database systems described herein may retain much of the structure of the upper half of the database instance, such as query parsing and query optimization layer, a query execution layer, and a transactionality and consistency management layer, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database, in some embodiments. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow copy creation, backup, restore, snapshots, point-in-time recovery, and volume growth operations to be performed more efficiently, e.g., by using metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions, in one embodiment.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), canceling or aborting a query, creating a snapshot, and/or other operations.

In some embodiments, the database tier of a database instance may include a database engine head node server that receives read and/or write requests from various client programs (e.g., applications) and/or subscribers (users), then parses them and develops an execution plan to carry out the associated database operation(s). For example, the database engine head node may develop the series of steps necessary to obtain results for complex queries and joins. In some embodiments, the database engine head node may manage communications between the database tier of the database system and clients/subscribers, as well as communications between the database tier and a separate distributed storage system.

In some embodiments, the database engine head node may be responsible for receiving SQL requests from end clients through a JDBC or ODBC interface and for performing SQL processing and transaction management (which may include locking) locally. However, rather than generating data pages locally, the database engine head node (or various components thereof) may generate redo log records and may ship them to the appropriate nodes of a separate distributed storage system. In some embodiments, a client-side driver for the distributed storage system may be hosted on the database engine head node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the database engine head node). For example, in embodiments in which data is made durable through the use of protection groups, the database engine head node may not be able to commit a transaction until and unless the client-side driver receives a reply from enough storage node instances to constitute a write quorum, as may be defined in a protection group policy for the data.

In some embodiments, the database tier (e.g., the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. A data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments. Note, however, that in embodiments that include such a cache, the cache may not be distributed across multiple nodes, but may exist only on the database engine head node for a given database instance. Therefore, there may be no cache coherency or consistency issues to manage.

In some embodiments, the database tier may support the use of synchronous or asynchronous read replicas in the system, e.g., read-only copies of data on different nodes of the database tier to which read requests can be routed. In such embodiments, if the database engine head node for a given database receives a read request directed to a particular data page, it may route the request to any one (or a particular one) of these read-only copies. In some embodiments, the client-side driver in the database engine head node may notify these other nodes about updates and/or invalidations to cached data pages (e.g., in order to prompt them to invalidate their caches, after which they may request updated copies of updated data pages from the storage layer).

In some embodiments, the client-side driver running on the database engine head node may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database, a number of replication copies, zones, or regions and/or whether replication is synchronous or asynchronous based upon their durability, performance and cost objectives.

In some embodiments, the client side driver may maintain metadata about the volume and may directly send asynchronous requests to each of the storage nodes necessary to fulfill read requests and write requests without requiring additional hops between storage nodes. The volume metadata may indicate which protection groups, and their respective storage nodes, maintain which partitions of the volume, in some embodiments. For example, in some embodiments, in response to a request to make a change to a database, the client-side driver may determine the protection group, and its one or more nodes that are implementing the storage for the targeted data page, and to route the redo log record(s) specifying that change to those storage nodes. The storage nodes may then be responsible for applying the change specified in the redo log record to the targeted data page at some point in the future, in some embodiments. As writes are acknowledged back to the client-side driver, the client-side driver may advance the point at which the volume is durable and may acknowledge commits back to the database tier, in some embodiments. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the database engine head node cache. However, write requests may require durability, since large-scale failure events may be too common to allow only in-memory replication. Therefore, the systems described herein may minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, data for a database may be stored in distributed data store. The processing capacity of the distributed data store may be leveraged, in various embodiments, to perform operations on the tuples or records stored within tables, instead of log records. Hash join operations, for instance, as discussed below with regard to FIGS. 7-9 may be partially (or fully) performed at the storage nodes in order to take advantage of parallelization of storage system resources, in some embodiments.

Figure 2:
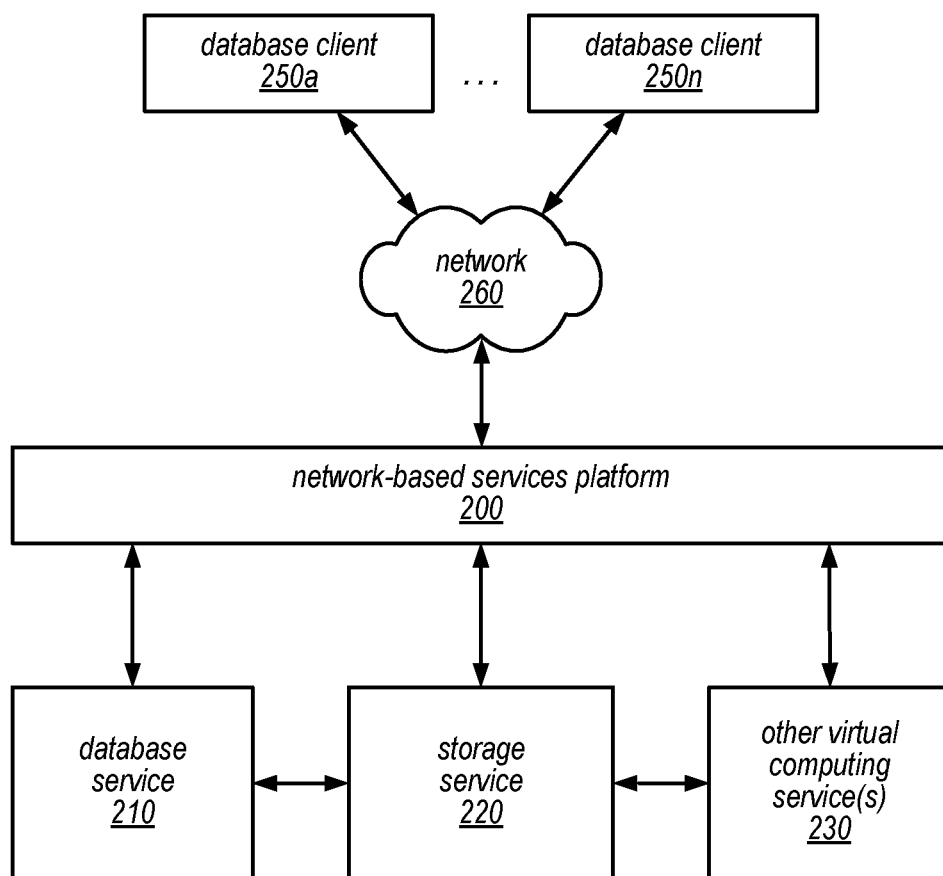
FIG. 2 is a logical block diagram illustrating a service system architecture for a network-based database service and a network-based storage service that performs storage-side filtering for hash joins executed for queries to the database service, according to some embodiments.

FIG. 2 is a logical block diagram illustrating a service system architecture for a network-based database service and a network-based storage service that performs storage-side filtering for hash joins executed for queries to the database service, according to some embodiments. In the illustrated embodiment, a number of clients (shown as clients 250a-250n) may interact with a network-based services platform 200 via a network 260. Network-based services platform 200 may interface with one or more instances of a database service 210, a distributed storage service 220 and/or one or more other virtual computing services 230. Storage service may be implemented as log-structured storage using a single log sequence number space. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Clients 250 may encompass any type of client configurable to submit network-based services requests to network-based services platform 200 via network 260, including requests for database services (e.g., a request to create a copy of a database, etc.). For example, a given client 250 may include a suitable version of a web browser, or may include a plug-in module or other type of code module that can execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more databases. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with network-based services platform 200. In some embodiments, client 250 may generate network-based services requests according to a Representational State Transfer (REST)-style network-based services architecture, a document- or message-based network-based services architecture, or another suitable network-based services architecture.

In some embodiments, a client 250 (e.g., a database service client) may provide access to storage of databases to other applications in a manner that is transparent to those applications. For example, client 250 may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to network-based services platform 200 may be coordinated by client 250 and the operating system or file system on behalf of applications executing within the operating system environment.

Clients 250 may convey network-based services requests (e.g., request to create a copy of a database, queries to a database, etc.) to and receive responses from network-based services platform 200 via network 260. In various embodiments, network 260 may encompass any suitable combination of networking hardware and protocols necessary to establish network-based-based communications between clients 250 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may implement one or more service endpoints that receive and process network-based services requests, such as requests to access data pages (or records thereof). For example, network-based services platform 200 may include hardware and/or software may implement a particular endpoint, such that an HTTP-based network-based services request directed to that endpoint is properly received and processed. In one embodiment, network-based services platform 200 may be implemented as a server system may receive network-based services requests from clients 250 and to forward them to components of a system that implements database service 210, storage service 220 and/or another virtual computing service 230 for processing (e.g. another data storage service, such as an object data store which may store data objects that make up a backup version data volumes stored in the storage service 220. In other embodiments, network-based services platform 200 may be implemented as a number of distinct systems (e.g., in a cluster topology) implementing load balancing and other request management features to dynamically manage large-scale network-based services request processing loads. In various embodiments, network-based services platform 200 may support REST-style or document-based (e.g., SOAP-based) types of network-based services requests.

In addition to functioning as an addressable endpoint for clients' network-based services requests, in some embodiments, network-based services platform 200 may implement various client management features, in some embodiments. For example, platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter, in some embodiments. Platform 200 may also implement financial accounting and billing systems, or may maintain a database of usage data that may be queried and processed by external systems for reporting and billing of client usage activity. In certain embodiments, platform 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics, in some embodiments. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, network-based services platform 200 may also implement user authentication and access control procedures. For example, for a given network-based services request to access a particular database, platform 200 may ascertain whether the client 250 associated with the request is authorized to access the particular database. Platform 200 may determine such authorization by, for example, evaluating an identity, password or other credential against credentials associated with the particular database, or evaluating the requested access to the particular database against an access control list for the particular database, in some embodiments. For example, if a client 250 does not have sufficient credentials to access the particular database, platform 200 may reject the corresponding network-based services request, for example by returning a response to the requesting client 250 indicating an error condition. Various access control policies may be stored as records or lists of access control information by database service 210, storage service 220 and/or other virtual computing services 230, in some embodiments.

It is noted that while network-based services platform 200 may represent the primary interface through which clients 250 may access the features of a database system that implements database service 210, it need not represent the sole interface to such features. For example, an alternate API that may be distinct from a network-based services interface may be used to allow clients internal to the enterprise providing the database system to bypass network-based services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed storage service 220 over a local or private network, (e.g., through an API directly between the systems that implement these services). In such embodiments, the use of distributed storage service 220 in storing databases on behalf of clients 250 may be transparent to those clients. In other embodiments, distributed storage service 220 may be exposed to clients 250 through network-based services platform 200 to provide storage of databases or other information for applications other than those that rely on database service 210 for database management. In such embodiments, clients of the distributed storage service 220 may access storage service 220 via network 260 (e.g., over the Internet). In some embodiments, a virtual computing service 230 receive storage services from storage service 220 (e.g., through an API directly between the virtual computing service 230 and storage service 220) to store objects used in performing computing services 230 on behalf of a client 250. In some cases, the accounting and/or credentialing services of platform 200 may be unnecessary for internal clients such as administrative clients or between service components within the same enterprise.

Although not illustrated, in various embodiments, storage service 220 may interface with backup data store, system, service, or device. Various data, such as data pages, log records, and/or any other data maintained by distributed storage service internal clients, such as database service 210 or other virtual computing services 230, and/or external clients such as clients 250a through 250n, may be sent to a backup data store.

Note that in various embodiments, different storage policies may be implemented by database service 210 and/or storage service 220. Examples of such storage policies may include a durability policy (e.g., a policy indicating the number of instances of a database (or data page thereof) that will be stored and the number of different nodes on which they will be stored) and/or a load balancing policy (which may distribute databases, or data pages thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for data pages.

Figure 3:
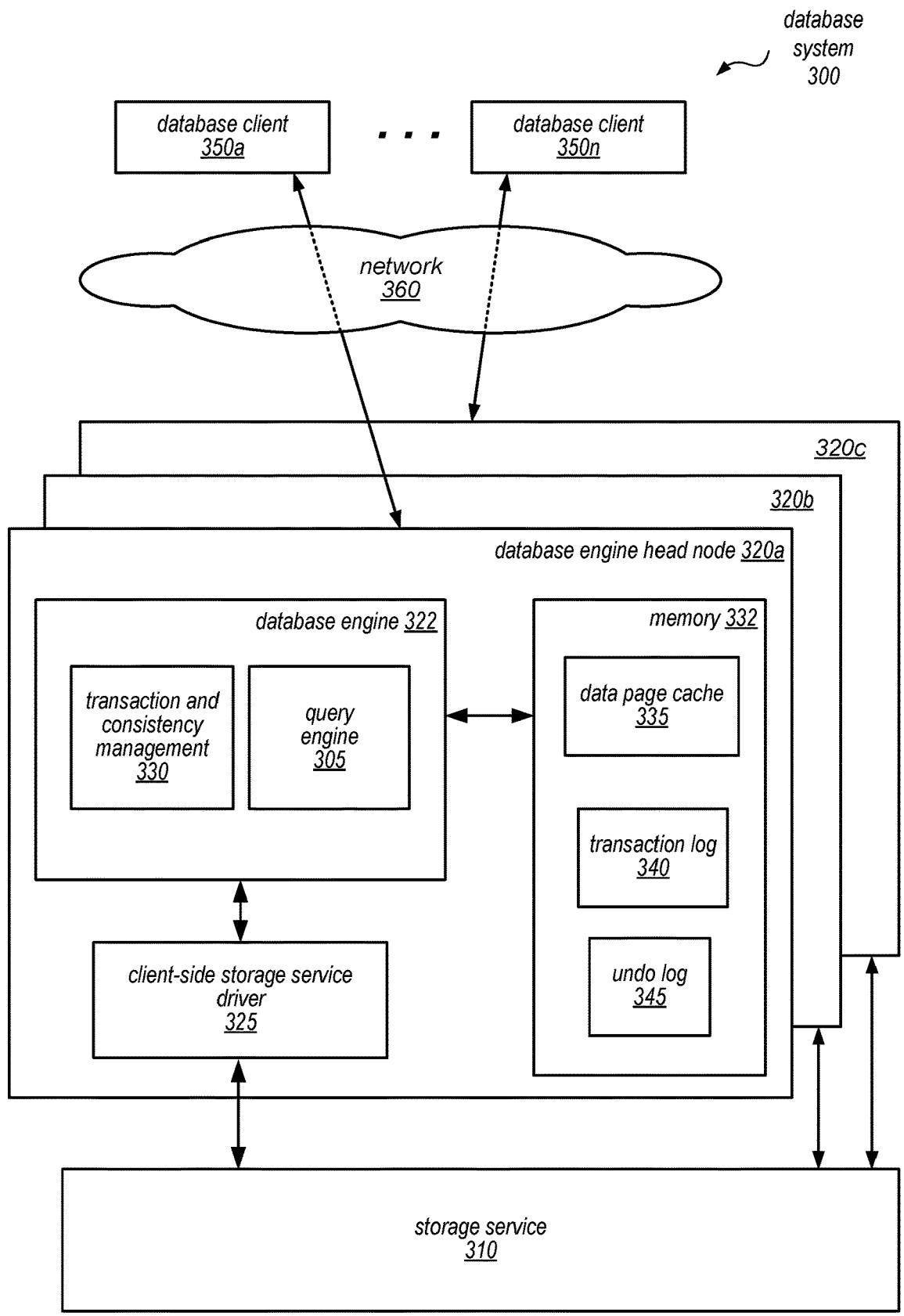
FIG. 3 is a block diagram illustrating various components of a database system that includes a database engine and a separate storage service, according to some embodiments.

FIG. 3 is a block diagram illustrating various components of a database system that includes a database engine and a separate storage service, according to some embodiments. In this example, database system 300 includes a respective database engine head node 320 for each of several databases and a distributed storage service 310 (which may or may not be visible to the clients of the database system, shown as database clients 350a-350n). As illustrated in this example, one or more of database clients 350a-350n may access a database head node 320 (e.g., head node 320a, head node 320b, or head node 320c, each of which is a component of a respective database instance) via network 360 (e.g., these components may be network-addressable and accessible to the database clients 350a-350n). However, storage service 310, which may be employed by the database system to store a database volume (such as data pages of one or more databases, as well as redo log records and/or other metadata associated therewith) and/or copies of a database volume on behalf of database clients 350a-350n, and to perform other functions of the database system as described herein, may or may not be network-addressable and accessible to the storage clients 350a-350n, in different embodiments. For example, in some embodiments, storage service 310 may perform various storage, access, change logging, recovery, log record manipulation, and/or space management operations in a manner that is invisible to storage clients 350a-350n.

As previously noted, each database instance may include a single database engine head node 320 that receives requests (e.g., queries to read or write data, etc.) from various client programs (e.g., applications) and/or subscribers (users), then parses them, optimizes them, and develops an execution plan to carry out the associated database operation(s). In the example illustrated in FIG. 3, query engine 305 may perform query parsing, optimization, and execution at database engine head node 320a may perform these functions for queries that are received from database client 350a and that target the database instance of which database engine head node 320a is a component. In at least some embodiments, query engine 305 may perform various operations and techniques to implement storage-side filtering for performing hash joins as discussed below with regard to FIGS. 6A-9. In some embodiments, query engine 305 may return query responses to database client 350a, which may include write acknowledgements, requested data pages (or portions thereof), error messages, and or other responses, as appropriate. As illustrated in this example, database engine head node 320a may also include a client-side storage service driver 325, which may route read requests and/or redo log records to various storage nodes within storage service 310, receive write acknowledgements from storage service 310, receive requested data pages from storage service 310, and/or return data pages, error messages, or other responses to query engine 305 (which may, in turn, return them to database client 350a). Client-side storage device may maintain mapping information about the database volume stored in storage service 310, such that a particular protection group maintaining a partition of the database volume may be determined. Read requests and redo log records may then be routed to storage nodes that are members of the protection group according to the partition of user data to which the read request is directed or to which the redo log record pertains.

In this example, database engine head node 320a includes a data page cache 335, in which data pages that were recently accessed may be temporarily held. As illustrated in FIG. 3, database engine head node 320a may also include a transaction and consistency management component 330, which may be responsible for providing transactionality and consistency in the database instance of which database engine head node 320a is a component. For example, this component may be responsible for ensuring the Atomicity, Consistency, and Isolation properties of the database instance and the transactions that are directed that the database instance. As illustrated in FIG. 3, database engine head node 320a may also include a transaction log 340 and an undo log 345, which may be employed by transaction and consistency management component 330 to track the status of various transactions and roll back any locally cached results of transactions that do not commit.

Note that each of the other database engine head nodes 320 illustrated in FIG. 3 (e.g., 320b and 320c) may include similar components and may perform similar functions for queries received by one or more of database clients 350a-350n and directed to the respective database instances of which it is a component.

In some embodiments, the storage systems described herein may organize data in various logical data volumes, extents (which may include partitions of the database (e.g., user data space) in the volume and a segmentation of the log for the volume) made durable among a protection group of storage nodes, segments (which may be data stored on an individual storage node of a protection group) and pages for storage on one or more storage nodes. For example, in some embodiments, each database is represented by a logical volume, and each logical volume is partitioned over a collection of storage nodes into extents. A protection group may be composed of different storage nodes in the storage service that together make an extent durable. Multiple segments, each of which lives on a particular one of the storage nodes in a protection group, are used to make the extent durable.

In some embodiments, each data page may be stored in a segment, such that each segment stores a collection of one or more data pages and a change log (also referred to as a redo log) (e.g., a log of redo log records) for each data page that it stores. Thus, change logs may be log records segmented to the protection group of which the segment is a member. In some embodiments, the storage nodes may receive redo log records (which may also be referred to herein as ULRs) and to coalesce them to create new versions of the corresponding data pages (e.g., if a data page of a copy of a database is shared with the database and the new version is created to create a different version included in the copy and not visible to the database) and/or additional or replacement log records (e.g., lazily and/or in response to a request for a data page or a database crash). In some embodiments, data pages and/or change logs may be mirrored across multiple storage nodes, according to a variable configuration, such as in a protection group (which may be specified by the client on whose behalf the databases are being maintained in the database system). For example, in different embodiments, one, two, or three copies of the data or change logs may be stored in each of one, two, or three different availability zones or regions, according to a default configuration, an application-specific durability preference, or a client-specified durability preference.

Figure 4:
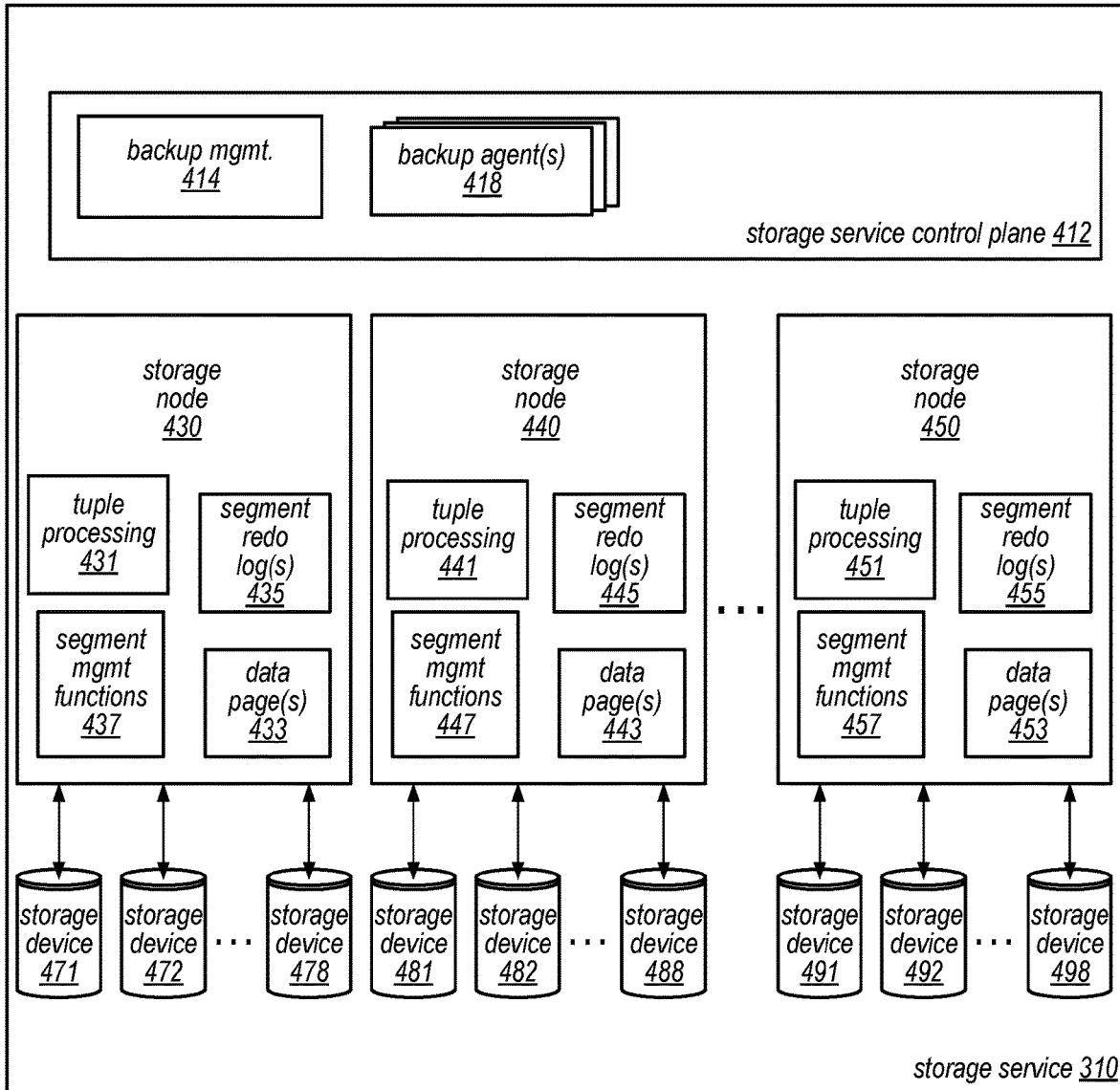
FIG. 4 is a logical block diagram illustrating a storage service that may perform storage-side filtering for hash joins, according to some embodiments.

One embodiment of a storage service is illustrated by the block diagram in FIG. 4. In at least some embodiments, storage nodes 430-450 may store data for different clients as part of a multi-tenant storage service.

In some embodiments, a client, such as a database engine head node, may communicate with storage system server nodes that store data as part of a database managed by a client-side storage service driver at the client. In this example, storage service includes multiple storage system server nodes (including those shown as 430, 440, and 450), each of which includes storage for data pages and redo logs for the segment(s) it stores, and hardware and/or software may perform various segment management functions 437.

For example, each storage system server node may include hardware and/or software may perform at least a portion of any or all of the following operations: replication (locally, e.g., within the storage node), coalescing of redo logs to generate data pages, log management (e.g., manipulating log records), crash recovery (e.g., determining candidate log records for volume recovery), creating copies of segments stored at the storage node (e.g., full type copies or shared type copies) and/or space management (e.g., for a segment). Each storage system server node may also have multiple attached storage devices (e.g., SSDs, HDDs, or other persistent storage devices) on which data blocks may be stored on behalf of clients (e.g., users, client applications, and/or database service subscribers).

In the example illustrated in FIG. 4, storage system server node 430 includes tuple processing 431 (to perform operations to support performing hash joins on individual records instead of data pages), data page(s) 433, segment redo log(s) 435, segment management functions 437, and attached storage devices 471-478. Similarly, storage system server node 440 includes tuple processing 441, data page(s) 443, segment redo log(s) 445, segment management functions 447, and attached storage devices 481-488; and storage system server node 450 includes tuple processing 451, data page(s) 453, segment redo log(s) 455, segment management functions 457, and attached storage devices 491-498.

In some embodiments, each of the storage system server nodes in the storage system may implement a set of processes running on the node server's operating system that manage communication with the database engine head node, e.g., to receive redo logs, send back data pages, etc. In some embodiments, all data blocks written to the storage system may be backed up to long-term and/or archival storage (e.g., in a remote key-value durable backup storage system.

In some embodiments, storage service 310 may also implement a storage service control plane 412. Storage service control plane 412 may be one or more compute nodes that may perform a variety of different storage system management functions. For example, storage control plane may implement a volume manager (not illustrated), which may maintain mapping information or other metadata for a volume, such as current volume state, current writer, truncation tables or other truncation information, or any other information for a volume as it is persisted in varying different, extents, segments, and protection groups. The volume manager may communicate with a client of storage system 410, such as client-side driver in order to "mount" or "open" the volume for the client, providing the client-side driver with mapping information, protection group policies, and various other information necessary to send write and read requests to storage nodes 430-450. The volume manager may provide the maintained information to storage clients, such as a database engine head node or client-side driver or to other system components such as backup agents 418. For example, the volume manager may provide a current volume state (e.g., clean, dirty or recovery), current epoch or other version indicator for the volume and/or any other information about the data volume.

In at least some embodiments, storage service control plane 412 may implement backup management 414. Backup management 414 may implement or direct multiple backup agents 418 which may backup data volumes stored at storage nodes. For example, in some embodiments task queue(s) may be implemented that identify backup operations to be performed with respect to data volumes (e.g., describing the range of LSNs of redo log records being included in a chunk or portion of data that is to be uploaded to the backup data store). Volume backup metadata may be included as part of the backup performed by backup agent(s) 418, including the volume geometry or configuration (e.g., including various extents, protection groups, stripes, etc.) and other information to generate a restored version of a data volume from data chunks stored in the separate backup data store.

Figure 5:
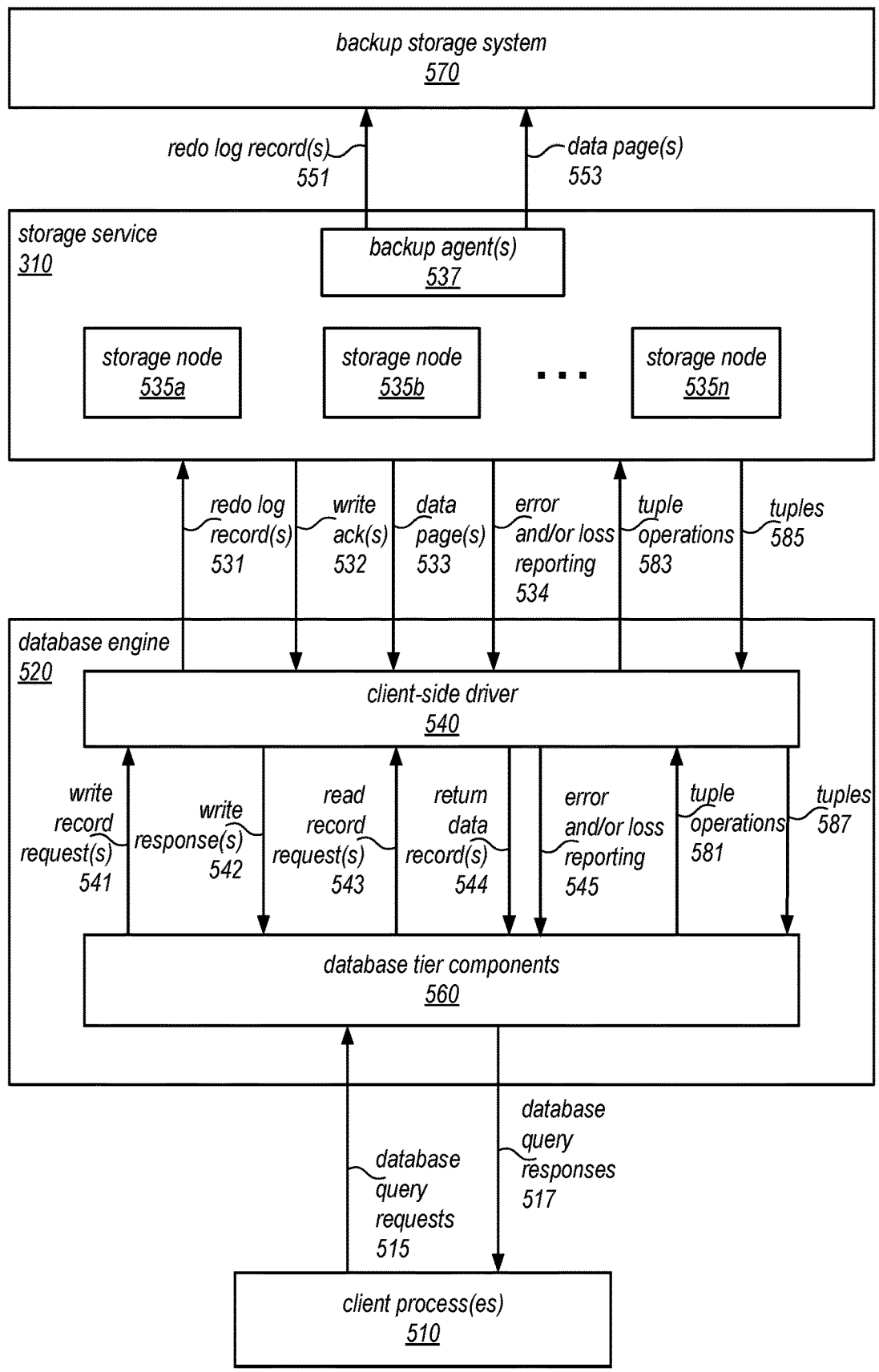
FIG. 5 is a logical block diagram illustrating the use of a separate storage service in a database system, according to some embodiments.

FIG. 5 is a block diagram illustrating the use of a separate storage system in a database system, according to one embodiment. In this example, one or more client processes 510 may store data to one or more databases maintained by a database system that includes a database engine 520 and a storage system 530. In the example illustrated in FIG. 5, database engine 520 includes database tier components 560 and client-side driver 540 (which serves as the interface between storage system 530 and database tier components 560). In some embodiments, database tier components 560 may perform functions such as those performed by query engine 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 510 may send database query requests 515 (which may include read and/or write requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to storage system 530. In this example, client-side driver 540 may generate one or more redo log records 531 corresponding to each write record request 541, and may send them to specific ones of the storage nodes 535 of specific protection groups storing the partition user data of user data space to which the write record request pertains in storage system 530. Storage nodes 535 may perform various peer-to-peer communications to replicate redo log records 531 received at a storage node to other storage nodes that may have not received the redo log records 531. For instance, not every storage node may receive a redo log record in order to satisfy a write quorum (e.g., 3 out of 5 storage nodes may be sufficient). The remaining storage nodes that do not receive or acknowledge the redo log record may receive an indication of it from a peer storage node that did acknowledge or receive the redo log record. Client-side driver 540 may generate metadata for each of the redo log records that includes an indication of a previous log sequence number of a log record maintained at the specific protection group. storage system 530 may return a corresponding write acknowledgement(s) 523 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In some embodiments, a database query request 515 that includes a request to read a data page may be parsed and optimized to generate one or more read record requests 543, which may be sent to client-side driver 540 for subsequent routing to storage system 530. In this example, client-side driver 540 may send these requests to specific ones of the storage nodes 535 of storage system 530, and storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517.

In some embodiments, a database query request 515 may include operations that may trigger the generation and sending of requests to perform various tuple operations 581. For example, a database query request that joins data from two tables according to a common field value for an entry or record (e.g., a "User ID" field), may cause the selection of a hash join operation as part of plan to perform the query by a query engine in database tier components 560, such as query engine 305, which may trigger scan and/or filtering operations that are sent as tuple operations 581 and 583 (which may cause storage nodes 535 to perform tuple evaluations instead of returning data pages by accessing the data pages themselves to read the data and perform the tuple operation (e.g., performing a scan, applying a filter, etc.). Responses to the tuple operations may be sent as tuples 585 and 587 respectively (e.g., as a tuple stream) which database tier components 560 may evaluate as part of performing a plan for the database query request 515 (e.g., by evaluating whether the returned tuples satisfy the join predicate according to a hash join operation) and use to provide database query responses 517.

In some embodiments, various error and/or data loss messages 534 may be sent from storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, backup nodes 537 may receive peer-to-peer indications from storage nodes 535. By evaluating these indications backup nodes 537 may identify additional redo log records received at storage nodes 535 that have not been backed up. Backup node(s) 537 may send chunks or objects containing a set of redo log records 551 to backup storage system 570 to be stored as part of a backup version of the data volume. In some embodiments, data pages 553 to create a full backup of the data volume (as opposed to log records describing the changes to the data volume) or copy of the data volume that may reference data pages stored in another data volume in backup storage system 570 may be requested from storage nodes and sent to backup storage system 570.

In some embodiments, the APIs 531, 532, 533, 534, 535, 583, and 585 of storage system 530 and the APIs 541, 542, 543, 544, 545, 581, 587, of client-side driver 540 may expose the functionality of the storage system 530 to database engine 520 as if database engine 520 were a client of storage system 530. For example, database engine 520 (through client-side driver 540) may write redo log records, request data pages, or direct tuple-based operations through these APIs to perform (or facilitate the performance of) various operations of the database system implemented by the combination of database engine 520 and storage system 530 (e.g., storage, access, change logging, recovery, and/or space management operations). As illustrated in FIG. 5, storage system 530 may store data blocks on storage nodes 535a-535n, each of which may have multiple attached SSDs. In some embodiments, storage system 530 may provide high durability for stored data block through the application of various types of redundancy schemes.

Note that in various embodiments, the API calls and responses between database engine 520 and storage system 530 (e.g., APIs 531-534, 583, 585) and/or the API calls and responses between client-side driver 540 and database tier components 560 (e.g., APIs 541-545, 581, 587), and between storage system 430 and backup data store 570 in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of network-based services. REST is an architectural style for hypermedia systems. A RESTful API (which may also be referred to as a RESTful network-based service) is a network-based service API implemented using HTTP and REST technology. The APIs described herein may in some embodiments be wrapped with client libraries in various languages, including, but not limited to, C, C++, Java, C# and Perl to support integration with system components.

Different types of filtering may be performed in order to aid in the performance of hash join operations for performing a query. For example, bloom filters (or other probabilistic data structures) may be applied to indicate which data may not satisfy a join predicate for the hash join operation, in various embodiments. Generation of bloom filters may occur as a table of a database is scanned, in various embodiments. For example, the value of the column in a database table which is being joined with another database table may be read and entered into the bloom filter (e.g., by applying one or multiple hash functions to the value). When the filter is used to evaluate entries of another table, if there is no "hit" in the bloom filter (e.g., set bit values in the bloom filter for a column value being evaluated), then the entry or record that contains that column value will not match, and thus not satisfy the join predicate for the hash join operation.

Bloom filter generation can be performed in different ways. For example, in FIG. 6A bloom filter generation is completed at the database engine head node, according to some embodiments. For example, database engine head node 610 (e.g., similar to database engine head node 320 in FIG. 3) may send instructions to the storage nodes storing data for a database, such as storage nodes 612, 614, and 616 (which may be similar to storage nodes 430, 440, and 450 in FIG. 4) to perform a scan of a build table for a hash join according to a join predicate respectively, as indicated at 620a, 620b, and 620c. The storage nodes may perform the scans of the build table (which may have been identified during the query planning for the query by using size or other estimates to select the smallest table being joined) and provide back the results (e.g., returning the column values of the build table being joined) respectively, as indicated at 622a, 622b, and 622c. Database engine head node 610 may receive the results from the storage nodes 612 and generate a bloom filter for the build table. Then, database engine head node 610 may send the bloom filter along with a request to scan a probe table (e.g., the other table being joined to the build table which may be used to probe a hash table generated from the build table) to the storage nodes, as indicated at 624*a*, 624*b*, and 624*c*, in various embodiments. The storage nodes may apply the bloom filter to exclude or otherwise not send results that do not have a hit in the bloom filter, providing filtered results back to database engine head node 610, as indicated at 626*a*, 626*b*, and 626*c*.

Figure 6A:
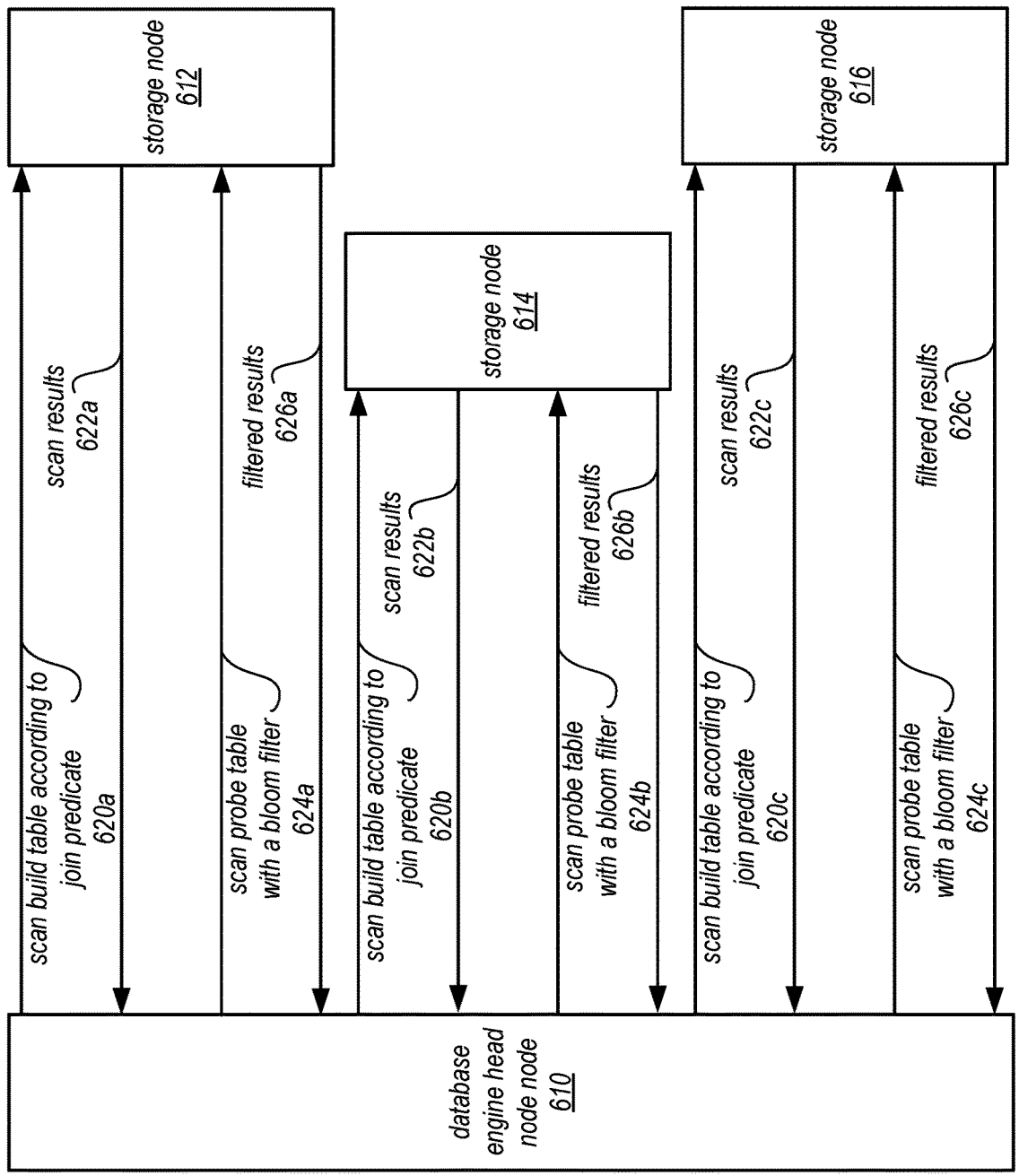
FIGS. 6A-6C are logical block diagram illustrating interactions provide bloom filters to storage nodes for filtering data to perform a hash join operation, according to some embodiments.
Figure 6B:
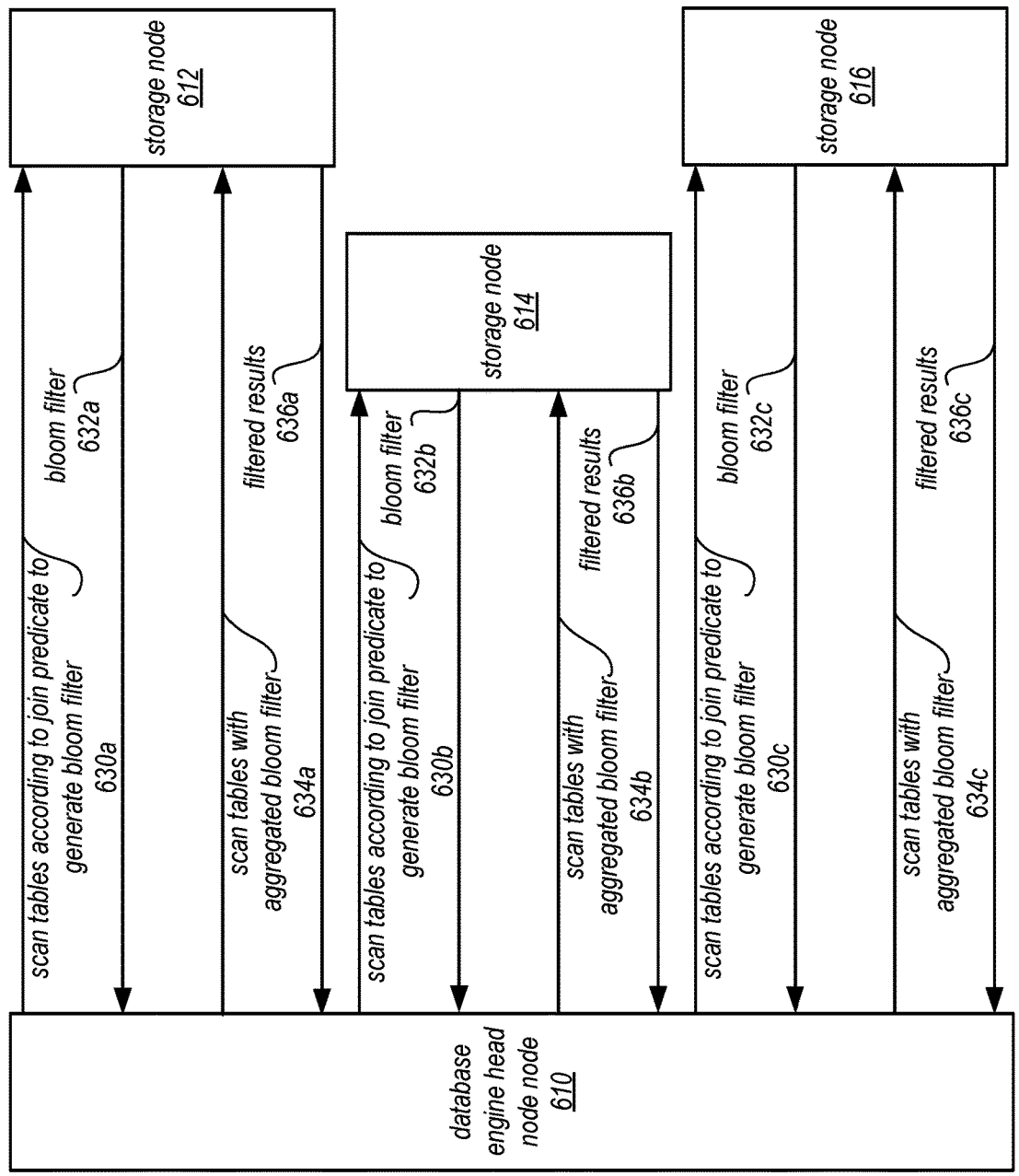

In some scenarios, the generation of a bloom filter may generated, in part, at the storage nodes, saving further data transfer costs as respective bloom filters may be returned instead of the data from the build or probe tables. For example, FIG. 6B illustrates the generation of individual bloom filters at storage nodes to be used for performing a hash join operation. Database engine head node 610 may send a request to scan both tables (e.g., the build table and probe table) according to the join predicate to generate a respective bloom filter for the storage nodes, as indicated at 630*a*, 630*b*, and 630*c*, in some embodiments. The storage nodes may, for instance, scan each table, setting the respective bloom filters with the column values of the build and probe table found at each table according to the join predicate. After scanning the tables, the storage nodes may return the respective bloom filters, as indicated at 632*a*, 632*b*, and 632*c*. Database engine head node 610 may combine the bloom filters into a single, aggregated bloom filter, which may be provided to each storage node as part of a request to scan the tables using the aggregated bloom filter, as indicated at 634*a*, 634*b*, and 634*c*, in some embodiments. The storage nodes may then scan the tables and apply the aggregated filter (which would allow the storage nodes to exclude data which would not satisfy the join predicate at any of the entries stored at the different storage nodes). The filtered results may be returned to the database engine head node 610, as indicated at 636*a*, 636*b*, and 636*c*, which may complete the join operation, in various embodiments.

Figure 6C:
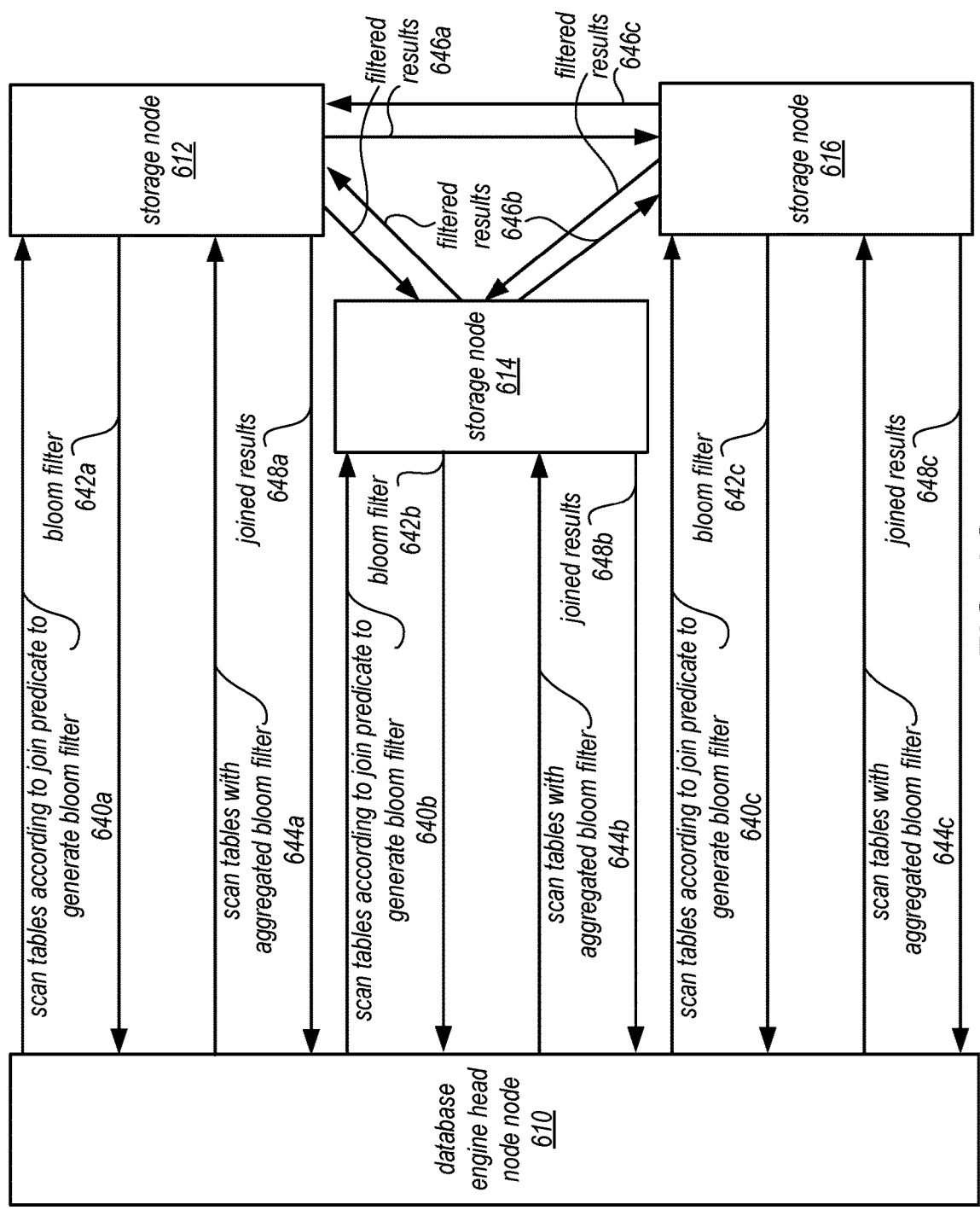

In some scenarios, joining of data records may be performed at the storage nodes. For example, FIG. 6C illustrates similar techniques to generate a bloom filter at storage nodes, as discussed above with regard to FIG. 6B. In FIG. 6C, requests to scan the tables according to the join predicate to generate the bloom filters for the storage nodes are sent, as indicated at 640*a*, 640*b*, and 640*c*. The respective bloom filters may then be sent back, as indicated at 642*a*, 642*b*, and 642*c*. Similarly, requests to use the aggregated filter to scan the tables being joined may be sent to the storage nodes, as indicated at 644*a*, 644*b*, and 644*c*. When performing the scan of tables applying the aggregated filter results in filtered results for a table that may fit within memory, then the filtered results may be replicated amongst the storage nodes, as indicated at 646*a*, 646*b*, and 646*c*. The filtered results for the one table may be combined so that each storage node can join those records from the other table using the filtered results (as each storage node can determine whether an entry of the other table matches any of the entries at any of the storage nodes for the table using the filtered results), in some embodiments. In at least some embodiments, filtered results 646 may be represented as the entries themselves or may be partial hash tables (e.g., built from the build table) which can be probed at the other storage nodes respectively. In this way, instead of sending filtered results to be joined at the database engine head node, the storage nodes may send joined results to the database engine head node 610, as indicated at 648*a*, 648*b*, and 648*c*.

Figure 7:
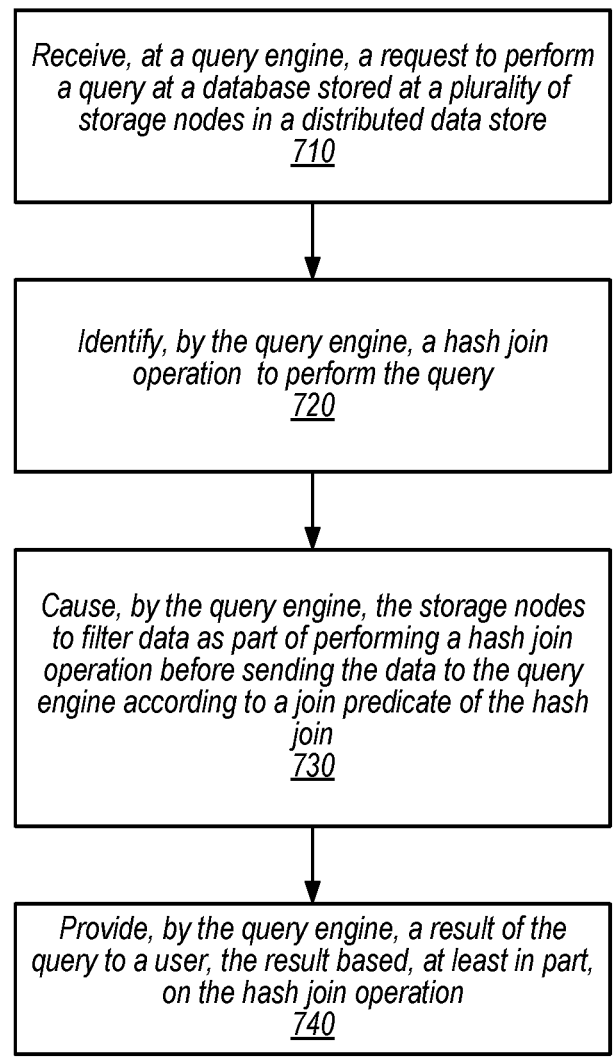
FIG. 7 is a high-level flowchart illustrating methods and techniques to implement storage-side filtering for performing hash joins, according to some embodiments.

The storage service and database service discussed in FIGS. 2 through 6C provide examples of a database system that implements storage-side filtering for performing hash joins. However, various other types of storage systems and database systems may implement storage-side filtering for performing hash joins. FIG. 7 is a high-level flowchart illustrating methods and techniques to implement storage-side filtering for performing hash joins, according to some embodiments. Various components, systems, or devices, described above may perform the techniques described below with respect to FIGS. 8-9 as well as different database systems and data stores.

As indicated at 710, a request to perform a query at a database stored at a plurality of storage nodes in a distributed data store may be received at a query engine, in some embodiments. As discussed above with regard to FIGS. 1 and 5, the query engine may be hosted on a server, node, or other computing device separate from the distributed data store, such as a database engine head node discussed above, in some embodiments. The database may be stored as a plurality of partitions across the different storage nodes, in some embodiments. The query may be specified according to a query language (e.g., SQL), programmatic interface (e.g., API), or other protocol or format, in some embodiments. The query may include a predicate, feature, or other criteria that joins data from two or more tables stored in the database.

As indicated at 720, a hash join operation may be identified by the query engine to perform the query. For example, query plan generation may analyze the cost of performing different types of join techniques or operations to perform a join specified in the query, in some embodiments. The hash join operation may be selected as a part of selecting a lowest cost plan or a lowest cost join technique, in some embodiments.

As indicated at 730, the storage nodes may be caused by the query engine to filter data as part of performing the hash join operation before sending the data to the query engine according to a join predicate of the hash join, in some embodiments. For example, different probabilistic data structures, such as bloom filters, skip lists, or quotient filters, may be used to indicate the presence of values in a table being joined (e.g., join predicate values in a table being joined, such as the build table (which may be the smallest table of the tables being joined)) or a range of values (e.g., a range filter, which may be represented by a bit map or bit vector that maps ranges of values to bits in the map/vector). Instructions or other requests may be sent from the query engine to the storage node which identifies filter for the join predicate. As discussed in detail below with regard to FIGS. 8 and 9, filters can be generated in various ways before the filter is applied to values that are returned to the query engine when performing the instructions. The instructions may be formatted according to a programmatic interface (e.g., respective API calls indicating types of scans, filter, filter type, instructions to generate the bloom filter from both tables, instructions to determine partitioning schemes for the results, etc.).

The query may be performed using results provided as part of the hash join operation, in various embodiments. For example, the query may be performed according to the query plan by the query engine, in various embodiments, that identifies or indicates the hash join operation. To perform the hash join operation, the query engine may apply a hash table generated for one of the tables being joined (e.g., the build table) to evaluate values from other joined tables (e.g., the probe table) with respect to the values of the table (for which the hash table was generated) in order perform the hash join, in some embodiments. The values from one or more of the tables being joined may have satisfied the filter at the storage nodes before being sent to the query engine. In at least some embodiments, the hash join operation may be completed at the storage nodes (as discussed below with regard to FIG. 9).

In some embodiments, various other operations in addition to the hash join operation may be performed (e.g., summations, aggregations, counts, averages, etc.), other tables or data separate from tables or data involved in the join may be accessed and evaluated. As part of performing the query, the query engine may send other requests to perform read or write operations to the storage nodes of the distributed data store in addition to the instructions for applying the filter and the join predicate, in some embodiments. Results from the storage nodes in the distributed data store may be received as part of a tuple stream, in some embodiments.

As indicated at 740, a result of the query, the result based, at least in part, on the hash join operation, may be provided to a user, in various embodiments. For example, the results may be displayed, returned, or otherwise provided via a same interface that received the request to perform the query. In some embodiments, the results may be stored or directed to a different user device, storage system, or other location than the originating source of the request to perform the query.

One type of filter that may be provided to storage nodes to apply as part of performing a hash join operation is a bloom filter. Because bloom filters may be generated according to a scan of a table, in some embodiments, an optimizer or other query planning component may be determine how and/or where a bloom filter for performing a hash join operation should be performed. For example, if the costs for a plan that generates a bloom at the storage nodes of the distributed data store using multiple scans are lower than cost of a plan that generates the bloom filter at query engine, then the plan that instructs storage nodes to generate the bloom filter may be selected. Alternatively, if the cost of the plan to generate the bloom filter at the query engine is lower, then that plan may be selected.

Figure 8:
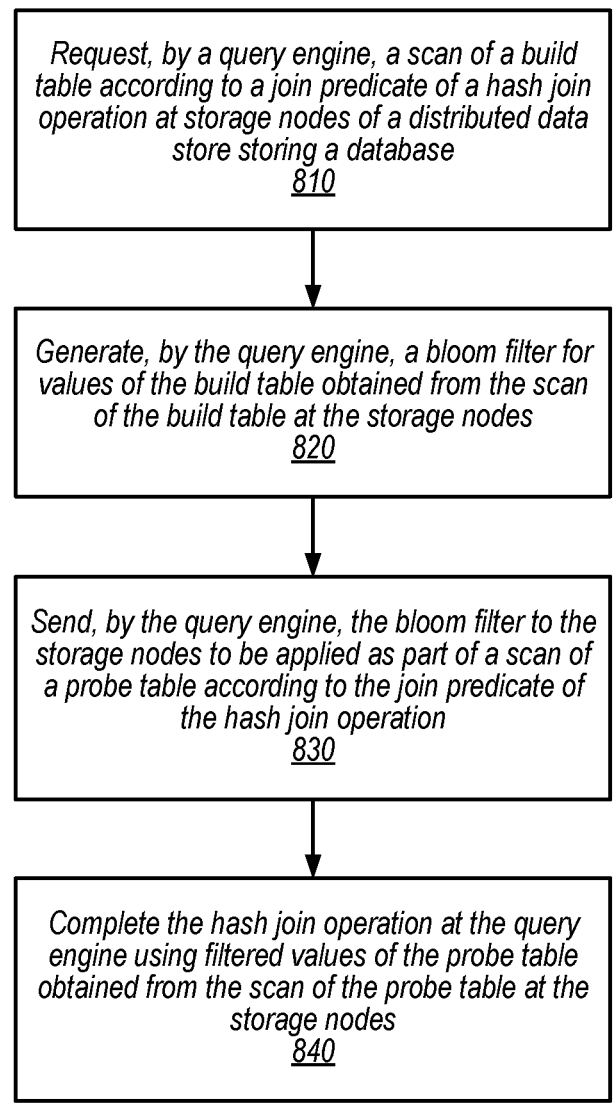
FIG. 8 is a high-level flowchart illustrating methods and techniques to implement generating a bloom filter at a query engine for application at storage nodes performing storage-side filtering, according to some embodiments.

FIG. 8 is a high-level flowchart illustrating methods and techniques to implement generating a bloom filter at a query engine for application at storage nodes performing storage-side filtering, according to some embodiments. As indicated at 810, a scan of a build table according to a join predicate of a hash join operation at storage nodes of a distributed data store storing a database may be requested by a query engine, in various embodiments. The scan request may include the join predicate (e.g., field names to match), table identifier, and other information to cause performance of the scan at the storage node, in some embodiments. The build table (e.g., the table for which the hash table of the hash join operation is to be built) may be selected as part query planning and optimization (e.g., according to table size, such as selecting the smallest table being joined), in some embodiments.

The storage nodes may receive the scan request, scan the build table identified in the request and return values of the join predicate from the records or rows of the build table to the query engine, in some embodiments. The values may be returned as tuples (e.g., as part of a tuple stream), in some embodiments. As indicated at 820, a bloom filter for the values obtained from the scan of the build table may be generated at the query engine, in various embodiments. For example, as the tuples are received, the bloom filter may be updated to mark the received value as present in the build table (e.g., by applying multiple hash functions to identify locations in a bit vector to be set to a value of "1").

Once the scan of the build table and generation of the bloom filter is finished, the bloom filter may be sent to each of the storage nodes in the distributed data store to be applied as part of a scan of a probe table according to the join predicate of the hash join operation, as indicated at 830, in various embodiments. For example, the bloom filter may be represented as a bit vector or array and sent as part of an instruction to perform the scan and apply the filter to values read from the probe table. If a read value is not present in the bloom filter, then the value may be discarded and not sent to the query engine. The query engine may also determine a partitioning scheme for sending values from the storage nodes to the query engine (e.g., partition boundaries, sizes, number, etc.), which may be performed in order to minimize the number of scans that have to be performed to obtain the data from different partitions and send the partitions to the query engine.

As indicated at 840, the query engine may complete the hash join operation using filtered values of the probe table obtained from the scan of the probe table at the storage nodes, in various embodiments. For example, the query engine may use the filtered values to probe a hash table generated for the build table in order to complete the hash join operation. In some embodiments, the filtered values may be received in an order determined according to a partitioning specified by the query engine (as noted above) or, in some embodiments, by the storage nodes. For example, partitioning of data for performing a join operation may be performed when the probe table (or other data, such as the hash table for performing the hash join operation) does not fit within memory allocated to the query engine. The query engine may store partitions of the probe table (or hash table) in other storage (e.g., disk or other persistent storage instead of in memory). The query engine may then evaluate perform a join evaluation for individual partitions of the probe table (which may be obtained by performing respective scans for the partitions at the storage nodes, in some embodiments. The determination of the partitioning may be used to size, number, or otherwise set boundaries for the partitions so that the number of scans to be performed is minimized.

Figure 9:
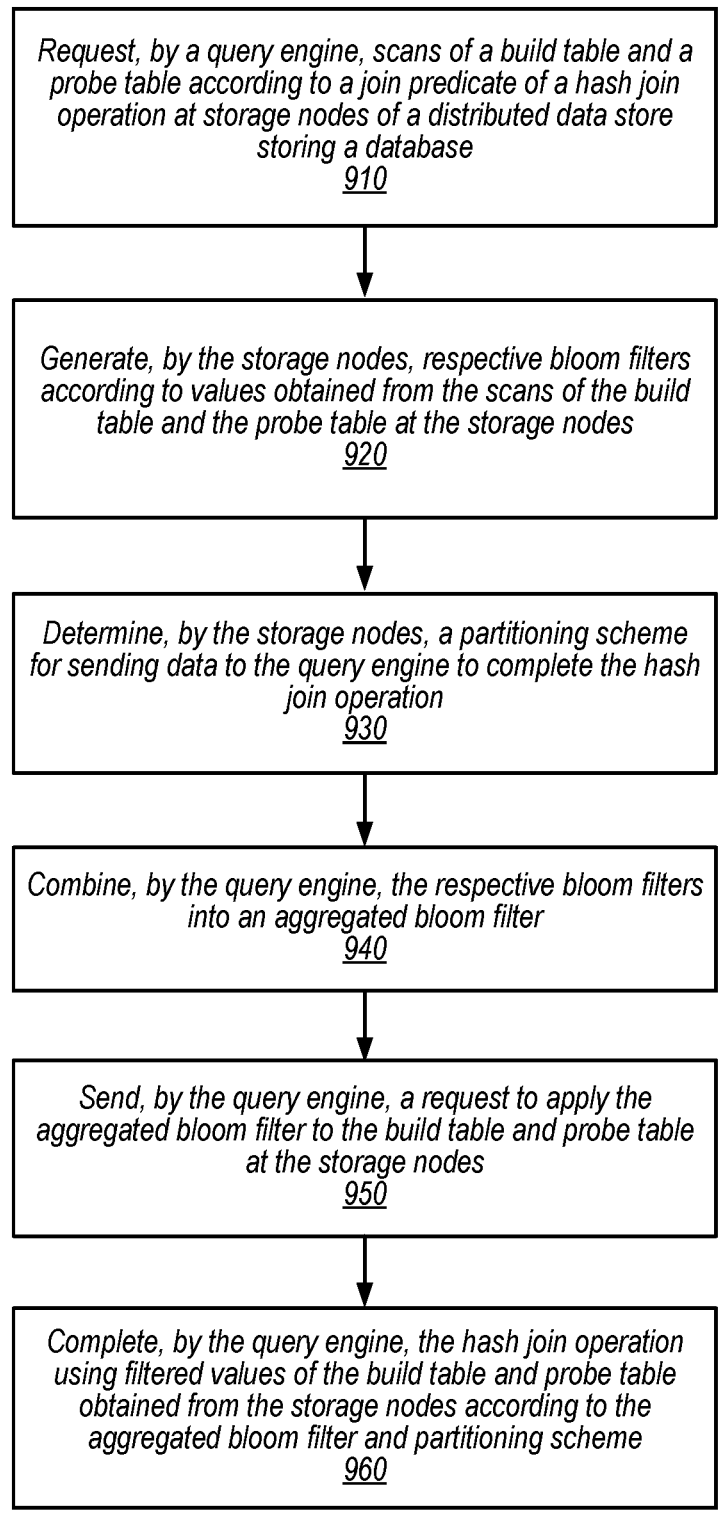
FIG. 9 is a high-level flowchart illustrating methods and techniques to implement generating bloom filters at storage nodes for application at storage nodes performing storage-side filtering, according to some embodiments.

FIG. 9 is a high-level flowchart illustrating methods and techniques to implement generating bloom filters at storage nodes for application at storage nodes performing storage-side filtering, according to some embodiments. As indicated at 910, scans of a build table and a probe table according to a join predicate of a hash join operation at storage nodes of a distribute data store storing a database may be requested by a query engine, in some embodiments. Similar to the requests discussed above in FIG. 8, the request may identify the tables, predicate field, and other information to perform the scan, such as which table is the build table and which table is the join table, in some embodiments.

As indicated at 920, respective bloom filters may be generated at the storage nodes based on the values obtained from the scans of the probe table and the build table at the storage nodes, in various embodiments. The storage nodes may, for example, update a bloom filter to mark the obtained values as present in the build table or probe table (e.g., by applying multiple hash functions to identify locations in a bit vector to be set to a value of "1"), in various embodiments. As indicated at 930, the storage nodes may determine a partitioning scheme for sending data to the query engine to complete the hash join operation, in some embodiments. For example, the storage nodes may evaluate the values that satisfy the join predicate in order to provide partitions of the data that would not exceed the capacity of the query engine to maintain the values in memory while performing the hash join operation, in some embodiments. A hashing or other partitioning or distribution scheme may be performed, in some embodiments, to partition the data to be provided to the query engine and, in some instances, partitioning may be recursively applied to create sub-partitions from the partitions until a desirable partition size is achieved for one (or more) of the determined partitions. Please note that the partitions created for performing the hash join operation are partitions for determining an order and/or selection of groups data to be processed and may be temporary and different from distribution schemes which may be sometimes called partitioning schemes or sharding schemes that identify which locations within a distributed storage system data is stored (e.g., on which storage nodes part of a table is stored).

The respective filters for each of the storage nodes may be sent to the query engine, in some embodiments. As indicated at 940, the respective bloom filters may be combined by the query engine into an aggregate bloom filter, in various embodiments. For example, bitwise operations (e.g., an "OR" operation) may be used to combine the individual bloom filters from the storage nodes into the aggregate bloom filter. The aggregate bloom filter may indicate as present in the build or probe table a value stored at any of the different partitions of the database at any of the storage nodes, in some embodiments. As indicated at 950, a request to apply the aggregated bloom filter to the build table and probe table at the storage nodes may be sent by the query engine to the storage nodes, in various embodiments. For example, the storage nodes may perform a scan of the build and probe table, applying the aggregate bloom filter to discard any rows that would not satisfy the join predicate according to the aggregate bloom filter, in some embodiments.

As indicated at 960, the hash join operation may be completed by the query engine using filtered values of the build table and probe table obtained from the storage nodes according to the aggregated bloom filter and partitioning scheme, in some embodiments. For example, the received probe values may be used to probe a hash table generated for the build table in order to complete the hash join operation at the query engine, in some embodiments. The values may be evaluated according to the order, size, and/or boundaries of partitions of the probe table that are determined at the storage nodes, in various embodiments.

In some scenarios, the hash join operation may be completed at the storage nodes instead of the query engine so that only "joined" results are provided to the query engine from the storage nodes, as discussed above with regard to FIG. 6C. For example, if the values that satisfy the join predicate from one of the tables (e.g., build or probe) are small enough to be stored in memory, then the values may be replicated to each of the storage nodes so that each storage node can join a result from the other table that matches one of the in-memory table values. Replication and joining operations can be determined and/or performed after applying the aggregated bloom filter to the tables, in some embodiments. In such scenarios, there may be some rows or values that could not be evaluated at the storage node, in some embodiments. Instead, these rows or values may be provided to the query engine for subsequent evaluation as to whether the rows or values satisfy the join.

Although the techniques discussed above with regard to FIGS. 6A-6C and 8-9 have been given in regard to bloom filters, similar techniques may be applied with respect to other kinds of filters, such as range filters which may indicate minimum or maximum values for tables (or partitions thereof). In some embodiments, multiple filters and/or other statistics may be collected and/or generated as part of scanning the tables which may be used for performing hash join operations or other query performance operations. In some embodiments, multiple filters may be sent or provided to storage nodes for performing the hash join operation. A bloom filter and a range filter (e.g., based on information obtained from prior scans of the tables at the storage nodes) may be provided to storage nodes, in one embodiment, which can then be applied to exclude some portions of the data from being sent back to the query engine.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the database services/systems and/or storage services/systems described herein). The various methods as illustrated in the figures and described herein represent example embodiments of methods. The order of any method may be changed, and various elements may be added, reordered, combined, omitted, modified, etc.

Figure 10:
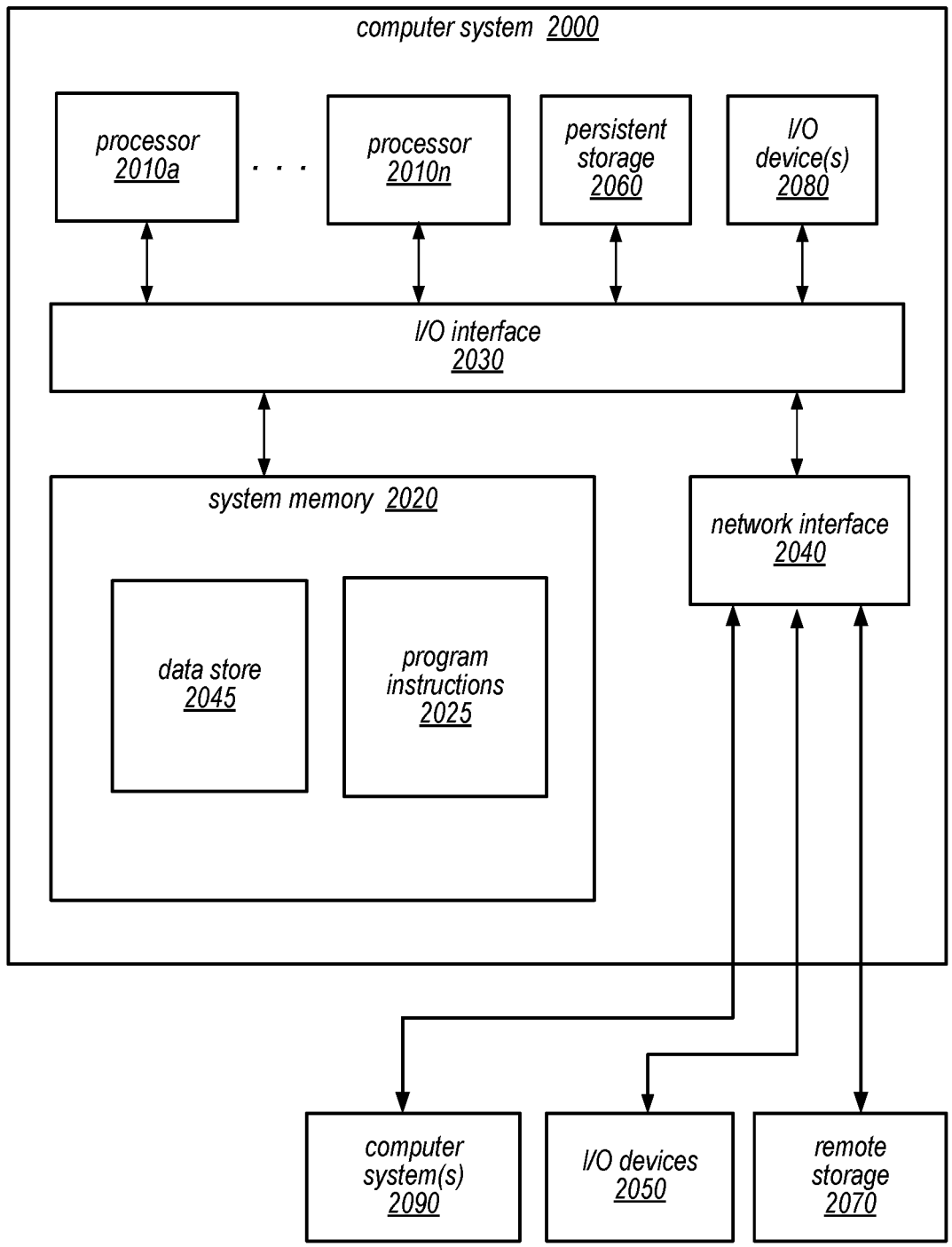
FIG. 10 is an example computer system, according to various embodiments.

FIG. 10 is a block diagram illustrating a computer system according to various embodiments, as well as various other systems, components, services or devices described above. For example, computer system 2000 may implement a database engine head node of a database tier, or one of a plurality of storage nodes of a separate distributed storage system that stores databases and associated metadata on behalf of clients of the database tier, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing node, compute node, or computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the database systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage node, and persistent storage 2060 may include the SSDs attached to that server node.

Computer system 2000 includes one or more system memories 2020 that can store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a database engine head node of a database tier, or one of a plurality of storage nodes, backup nodes, or restore nodes of a separate distributed storage system that stores databases and associated metadata on behalf of clients of the database tier, in different embodiments. In some embodiments, program instructions 2025 may implement multiple separate clients, nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be implemented as described herein. For example, the information described herein as being stored by the database tier (e.g., on a database engine head node), such as a transaction log, an undo log, cached page data, or other information used in performing the functions of the database tiers described herein may be stored in data store 2045 or in another portion of system memory 2020 on one or more nodes, in persistent storage 2060, and/or on one or more remote storage devices 2070, at different times and in various embodiments. Similarly, the information described herein as being stored by the storage tier (e.g., redo log records, coalesced data pages, and/or other information used in performing the functions of the distributed storage systems described herein) may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, database configuration information, and/or any other information usable in implementing the methods and techniques described herein.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a memory to store program instructions which, if performed by at least one processor, cause the at least one processor to perform a method to at least:
receive, at a query engine, a request to perform a query at a database stored separate from the query engine across a plurality of storage nodes in a distributed data store;
generate, by the query engine, a plan to perform the query, wherein to generate the plan, the program instructions cause the at least one processor to:
during the generation of the query plan:
identify a hash join operation to perform the query;
identify a build table for performing the hash join operation before accessing different tables of the database joined in the query based on respective sizes tracked for the different tables of the database joined in the query that can be determined before accessing the different tables of the database, wherein the identification of the build table determines that the build table is a smallest one of the respective tables;
after generation of the query plan to perform the query, execute, by the query engine, the query plan, wherein to execute the query plan, the query engine is configured to:
send, by the query engine to the plurality of storage nodes, respective requests over a network that instruct individual ones of the plurality of storage nodes associated with the hash join operation to perform a scan of the build table, identified in the query plan before the respective requests are sent, for the hash join according to a join predicate of the hash join operation;
generate, by the query engine, a filter using values of the build table obtained from the individual storage nodes based on the scan of the build table at the individual storage nodes;
send, by the query engine, respective requests and the filter generated by the query engine using the values from the individual storage nodes over the network that instruct the individual storage nodes to individually filter data stored at respective ones of the individual storage nodes according to the filter generated at the query engine as part of performing the hash join operation in the plan and then send filtered values over the network directly to the query engine; and
cause a result of the query to be provided to a user.

2. The system of claim 1,
wherein the program instructions cause the at least one processor to further perform the method to:
in response to another request to perform a different query, request, by the query engine, a scan of a different build table and a different probe table for a different hash join operation at the storage nodes according to a different join predicate;

generate, by the storage nodes, respective bloom filters according to values obtained from the scans of the different build table and the different probe table at the storage nodes;

combine, by the query engine, the respective bloom filters generated by the storage nodes into an aggregated bloom filter; and provide the aggregated bloom filter to the storage nodes to filter data as part of performing the different hash join operation before the storage nodes send the data over the network to the query engine.

3. The system of claim 1, wherein the query engine is hosted at a database engine head node of a network-based database service, wherein the distributed data store is a network-based storage service separate from the network-based database service, and wherein the respective requests sent to the storage nodes are sent according to an interface for the network-based storage service.

4. A method, comprising:

receiving, by a query engine, a request to perform a query at a database stored separate from the query engine at a plurality of storage nodes in a distributed data store;

generating, by the query engine, a plan to perform the query, comprising:

during the generation of the query plan:

identifying, by the query engine, a hash join operation to perform the query;

identifying a build table for performing the hash join operation before accessing different tables of the database joined in the query based on respective sizes tracked for the different tables of the database joined in the query that can be determined before accessing the different tables of the database, wherein the identification of the build table determines that the build table is a smallest one of the respective tables;

after generating the query plan to perform the query, executing, by the query engine, the query plan, comprising:

sending, by the query engine to the plurality of storage nodes, respective requests over a network that instruct individual ones of the plurality of storage nodes associated with the hash join operation to perform a scan of a build table, identified in the query plan before the respective requests are sent, for the hash join according to a join predicate of the hash join operation;

generating, by the query engine, a filter using values of the build table obtained from the individual storage nodes based on the scan of the build table at the individual storage nodes;

sending, by the query engine, respective requests and the filter generated by the query engine using the values from the individual storage nodes over the network to the individual storage nodes to individually filter data stored at respective ones of the individual storage nodes according to the filter generated at the query engine as part of performing the hash join operation in the plan and then send filtered values over the network directly to the query engine; and providing, by the query engine, a result of the query to a user, the result based, at least in part on the filtered values received from the plurality of storage nodes.

5. The method of claim 4, wherein the method further comprises:

in response to another request to perform a different query, requesting, by the query engine, a scan of a different build table and a different probe table for a different hash join operation at the storage nodes according to a different join predicate;

generating, by the storage nodes, different respective bloom filters according to values obtained from the scans of the different build table and the different probe table at the storage nodes;

combining, by the query engine, the different respective bloom filters generated by the storage nodes into an aggregated bloom filter; and providing the aggregated bloom filter to the storage nodes to filter data at the storage nodes as part of performing the different hash join operation before the storage nodes send the data over the network to the query engine.

6. The method of claim 5, further comprising:

replicating, by the storage nodes, filtered values of one of the tables amongst the storage nodes;

joining, by the storage nodes, the filtered values with values from another one of the tables obtained at the storage nodes to generate joined values for the different hash join operation; and sending, by the storage nodes, the joined values for the different hash join operation to the query engine.

7. The method of claim 4, further comprising:

determining, by the storage nodes, a partitioning scheme for performing the hash join operation, wherein filtered values returned to the query engine by the storage nodes are returned according to the partitioning scheme.

8. The method of claim 4, further comprising:

determining, by a head node of the storage nodes, a partitioning scheme for performing the hash join operation, wherein filtered values returned to the query engine by the storage nodes are evaluated by the query engine according to the partitioning scheme.

9. The method of claim 4, wherein sending, by the query engine, respective requests over a network to the storage nodes to filter data at the storage nodes as part of performing the hash join operation before the storage nodes send the data over the network to the query engine according to a join predicate of the hash join operation comprises sending two or more filters to be applied at the storage nodes.

10. The method of claim 9, wherein the two or more filters comprise a bloom filter and a range filter.

11. The method of claim 4, wherein the query engine is hosted at a database engine head node of a network-based database service, wherein the distributed data store is a network-based storage service separate from the network-based database service, and wherein sending, by the query engine, respective requests over the network to the storage nodes to filter data at the storage nodes as part of performing the hash join operation before the storage nodes send the data over the network to the query engine comprises sending requests to the storage nodes according to an interface for the network-based storage service.

12. A non-transitory, computer-readable storage medium, storing program instructions that when executed by one or more computing devices cause the one or more computing devices to implement:

receiving, by a query engine, a request to perform a query at a database stored separate from the query engine at a plurality of storage nodes in a distributed data store;

generating, by the query engine, a plan to perform the query, wherein the program instructions cause the one or more computing devices to implement:

during the generation of the query plan:

identifying, by the query engine, a hash join operation to perform the query;

identifying a build table for performing the hash join operation before accessing different tables of the database joined in the query based on respective sizes tracked for the different tables of the database joined in the query that can be determined before accessing the different tables of the database, wherein the identification of the build table determines that the build table is a smallest one of the respective tables;

after generating the query plan to perform the query, executing, by the query engine, the query plan, wherein in executing the query plan, the program instructions cause the one or more computing devices to implement:

sending, by the query engine to the plurality of storage nodes, respective requests over a network that instruct individual ones of the plurality of storage nodes associated with the hash join operation to perform a scan of a build table, identified in the query plan before the respective requests are sent, for the hash join according to a join predicate of the hash join operation;

generating, by the query engine, a filter using values of the build table obtained from the individual storage nodes based on the scan of the build table at the individual storage nodes;

sending, by the query engine, respective requests and the filter generated by the query engine using the values from the individual storage nodes over the network to the individual storage nodes to individually filter data stored at respective ones of the individual storage nodes according to the filter generated at the query as part of performing the hash join operation in the plan and then send filtered values over the network directly to the query engine;

receiving, by the query engine, the filtered values from the storage nodes for performing the hash join operation; and providing, by the query engine, a result of the query to a user, the result based, at least in part on the filtered values received from the storage nodes.

13. The non-transitory, computer-readable storage medium of claim 12, wherein the filter is a bloom filter.

14. The non-transitory, computer-readable storage medium of claim 12, wherein the program instructions cause the one or more computing devices to further implement:

in response to another request to perform a different query, requesting, by the query engine, a scan of a different build table and a different probe table for a different hash join operation at the storage nodes according to a join predicate;

generating, by the storage nodes, respective filters according to values obtained from the scans of the different build table and the different probe table at the storage nodes;

combining, by the query engine, the respective filters generated by the storage nodes into an aggregated bloom filter; and providing the aggregated bloom filter to the storage nodes to filter data at the storage nodes as part of performing the different hash join operation before the storage nodes send the data over the network to the query engine.

15. The non-transitory, computer-readable storage medium of claim 14, wherein the respective filters are range filters, and wherein the aggregated bloom filter is an aggregated range filter.

16. The non-transitory, computer-readable storage medium of claim 12, wherein the query engine is hosted at a database engine head node of a network-based database service, wherein the distributed data store is a network-based storage service separate from the network-based database service, and wherein, in sending, by the query engine, respective requests over the network to the storage nodes to filter data at the storage nodes as part of performing the hash join operation before the storage nodes send the data over the network to the query engine, the program instructions cause the one or more computing devices to implement sending requests to the storage nodes according to an interface for the network-based storage service.

* * * * *